United States Patent
Eshelman et al.

(10) Patent No.: US 6,594,531 B2
(45) Date of Patent: Jul. 15, 2003

(54) MODULAR OPTIMIZER WITH FOREIGN MODULE LEARNING FEATURE FOR OPTIMIZATION OF COMPONENT PLACEMENT MACHINES

(75) Inventors: Larry J. Eshelman, Ossining, NY (US); J. David Schaffer, Wappingers Falls, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 212 days.

(21) Appl. No.: 09/745,946

(22) Filed: Dec. 22, 2000

(65) Prior Publication Data

US 2002/0083026 A1 Jun. 27, 2002

(51) Int. Cl.[7] .......... G05B 13/02; G06F 19/00; G06N 3/00; H05K 3/30
(52) U.S. Cl. .......... 700/28; 700/48; 700/121; 29/832; 706/13; 706/62
(58) Field of Search .......... 700/28, 47–49, 700/97, 99, 121; 29/832; 706/13, 45, 62

(56) References Cited

U.S. PATENT DOCUMENTS

| | | | |
|---|---|---|---|
| 5,390,283 A | | 2/1995 | Eshelman et al. .......... 395/13 |
| 5,825,645 A | * | 10/1998 | Konar et al. .......... 700/28 |
| 5,864,833 A | | 1/1999 | Schaffer et al. .......... 706/13 |
| 5,909,674 A | | 6/1999 | Schaffer et al. .......... 706/13 |
| 5,933,349 A | * | 8/1999 | Dalgleish et al. .......... 29/832 |
| 6,055,483 A | * | 4/2000 | Lu .......... 700/20 |
| 6,115,640 A | * | 9/2000 | Tarumi .......... 700/100 |
| 6,275,815 B1 | * | 8/2001 | Schaffer et al. .......... 706/13 |
| 6,289,582 B1 | * | 9/2001 | Maenishi et al. .......... 29/564.1 |
| 6,347,253 B1 | * | 2/2002 | Fujita et al. .......... 700/173 |
| 6,487,544 B1 | * | 11/2002 | Eshelman et al. .......... 706/13 |
| 6,490,572 B2 | * | 12/2002 | Akkiraju et al. .......... 706/19 |
| 2001/0044661 A1 | * | 11/2001 | Kaji et al. .......... 700/28 |

* cited by examiner

*Primary Examiner*—Leo Picard
*Assistant Examiner*—Elliot Frank
(74) *Attorney, Agent, or Firm*—Steven R. Biren

(57) ABSTRACT

A modular optimizer, for use in determining a configuration of a production line with one or more component placement machines, is configured to learn a foreign optimizer module associated with a component placement machine type foreign to the modular optimizer. The modular optimizer includes an adapting estimator which estimates an output value, such as a placement cycle time measure, for the foreign optimizer module. The estimated output value may be used in determining the configuration of the production line.

20 Claims, 2 Drawing Sheets

MODULAR OPTIMIZER WITH FOREIGN MODULE LEARNING FEATURE FOR OPTIMIZATION OF COMPONENT PLACEMENT MACHINES

RELATED APPLICATION

The present invention is related to the invention described in U.S. patent application Ser. No. 09/286,026 filed Apr. 5, 1999 in the name of inventors Larry J. Eshelman and J. David Schaffer and entitled "Method for Optimizing a Line of Pick and Place Machines," which is commonly assigned herewith and incorporated by reference herein.

FIELD OF THE INVENTION

The present invention relates generally to component placement machines, such as so-called "pick and place", machines used in assembly of surface mount devices (SMDs) and other components onto printed circuit boards (PCBs), and more particularly to optimizers for use in configuring such machines.

BACKGROUND OF THE INVENTION

Known techniques for optimization of pick and place machines and other types of component placement machines are described in U.S. Pat. No. 5,390,283 issued Feb. 14, 1995 in the name of inventors Larry J. Eshelman and J. David Schaffer and entitled "Method for Optimizing the Configuration of a Pick and Place Machine," U.S. Pat. No. 5,864,833 issued Jan. 26, 1999 in the name of inventors J. David Schaffer and Murali Mani and entitled "Apparatus for Optimizing the Layout and Charge Maps of a Flowline of Pick and Place Machines," and U.S. Pat. No. 5,909,674 issued Jun. 1, 1999 in the name of inventors J. David Schaffer and Murali Mani and entitled "Method for Optimizing the Layout and Charge Maps of a Flowline of Pick and Place Machines," all of which are commonly assigned with the present application and incorporated by reference herein.

Despite the considerable advances provided by the techniques described in the above-cited references, further improvements are needed in optimization of lines of component placement machines. For example, existing modular optimizers for component placement machines generally require that new optimizer modules be developed for any new machine types to be added to a given production line. Although many of the new machine types may already have their own optimizers, such optimizers are often not appropriate for use in the modular optimizer. As a more specific example, the optimizers for the new machines may be non-genetic algorithm (GA) based optimizers that run far too slowly to be called the many thousands of times typical of a GA-based based modular optimizer such as that described in the above-cited U.S. patent application Ser. No. 09/286,026. It is therefore apparent that a need exists for a modular optimizer which is capable of learning and utilizing a foreign optimizer module in an efficient manner.

SUMMARY OF THE INVENTION

The invention provides improved techniques for optimization of component placement machines. In accordance with one aspect of the invention, a modular optimizer is configured to utilize a foreign optimizer module in an efficient manner.

More particularly, a modular optimizer, for use in determining a configuration of a production line with one or more component placement machines, is configured to utilize a foreign optimizer module associated with a component placement machine type foreign to the modular optimizer. The foreign optimizer module is "foreign" in that it is unable to generate outputs in accordance with the particular requirements of the modular optimizer. However, the modular optimizer includes an adapting estimator which estimates an output value, such as a placement cycle time measure, for the foreign optimizer module. The estimated output value may be used in determining the configuration of the production line.

In accordance with another aspect of the invention, the modular optimizer periodically calls the foreign optimizer module, and for a given one of the calls compares a resulting output value generated by the foreign optimizer module to the corresponding estimated output value generated by the adapting estimator. If for a given call of the foreign optimizer module the actual output value for a corresponding estimated value is determined to provide an improved result, one or more parameters of the estimator are altered so as to reduce an error associated with generation of subsequent estimated output values.

In accordance with a further aspect of the invention, the foreign optimizer module may be called based at least in part on a restart of a genetic algorithm (GA) of the modular optimizer. For example, the foreign optimizer module may be called whenever there is a restart of the GA and a new best individual has been found since a previous restart. The calling of the foreign optimizer module may alternatively be based on other criteria. For example, the foreign optimizer module may be called each time a new offspring of the GA is encountered that is likely to get into a surviving population, or whenever a potentially new best individual is encountered in the GA.

Advantageously, the invention allows the full optimization of the foreign optimizer module to be run only intermittently, in accordance with its own particular run time requirements. Over time, the adapting estimator learns about the operation of the foreign optimizer module, and thus becomes a more accurate predictor of its outputs.

DETAILED DESCRIPTION OF THE INVENTION

The present invention provides techniques for configuring modular component placement machine optimizers so as to facilitate the utilization of one or more foreign optimizer modules. The term "foreign" as used in this context refers to an optimizer module which is unable to generate outputs in accordance with the particular requirements of a given modular optimizer. For example, in a modular optimizer based on a genetic algorithm (GA), a foreign optimizer module may be an optimizer module having run time requirements which exceed those of the GA-based optimizer. The foreign optimizer in this case may, but need not, be a non-GA-based optimizer module.

The invention will be illustrated in conjunction with example production line, component placement machine and modular optimizer elements. It should be understood, however, that these elements are shown by way of example only, and are not intended to limit the scope of the invention. Those skilled in the art will recognize that the features provided by the present invention can be implemented using numerous other arrangements of these and other elements.

I. Example Production Line

Figure 1:
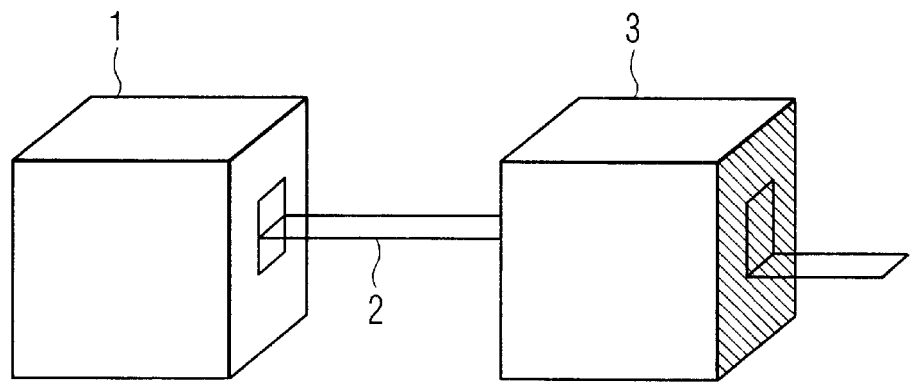
FIG. 1 is a simplified diagram showing an example production line with two component placement machines that may be configured using a modular optimizer with a foreign module learning feature in accordance with the invention.

FIG. 1 shows a simplified diagram of a production line that may be configured using a modular optimizer in accordance with the present invention. The production line includes a first component placement machine 1, a conveyor 2, and a second component placement machine 3. Printed circuit boards (PCBs) or other component mounting support structures pass through the machines 1, 3 of the line on the conveyor 2. One or more of the component placement machines 1, 3 may be, e.g., a Fast Component Mounter (FCM) machine or an Advanced Component Mounter (ACM) machine, which are types of component placement machines known in the art and described in greater detail in the above-cited U.S. Pat. Nos. 5,390,283, 5,864,833 and 5,909,674 and the above-cited U.S. patent application Ser. No. 09/286,026, or a foreign machine having an optimizer module unable to generate outputs in accordance with the particular requirements of a given modular optimizer.

Although the figure shows a production line having only two machines, the invention is applicable to production lines with more than two machines. In addition, the machines of a given production line may include one or more machines for each of a number of different machine types. For example, the illustrative embodiment of the invention to be described below is configured to optimize a production line having one or more FCM machines, one or more ACM machines, and at least one foreign machine, e.g., a machine having an optimizer module which is unable to generate outputs in accordance with the requirements of a GA-based modular optimizer.

II. Example Modular Optimizer

An example modular optimizer in accordance with the illustrative embodiment of the invention will now be described in conjunction with FIGS. 2 and 3. This example modular optimizer is similar to the modular optimizer described in greater detail in the above-cited U.S. patent application Ser. No. 09/286,026, but is modified to include a foreign optimizer module learning feature in accordance with the present invention. It should be understood, however, that the techniques of the invention are more generally applicable to any type of modular optimizer for component placement machines in which it is desirable to implement a capability for learning a foreign optimizer module.

Figure 2:
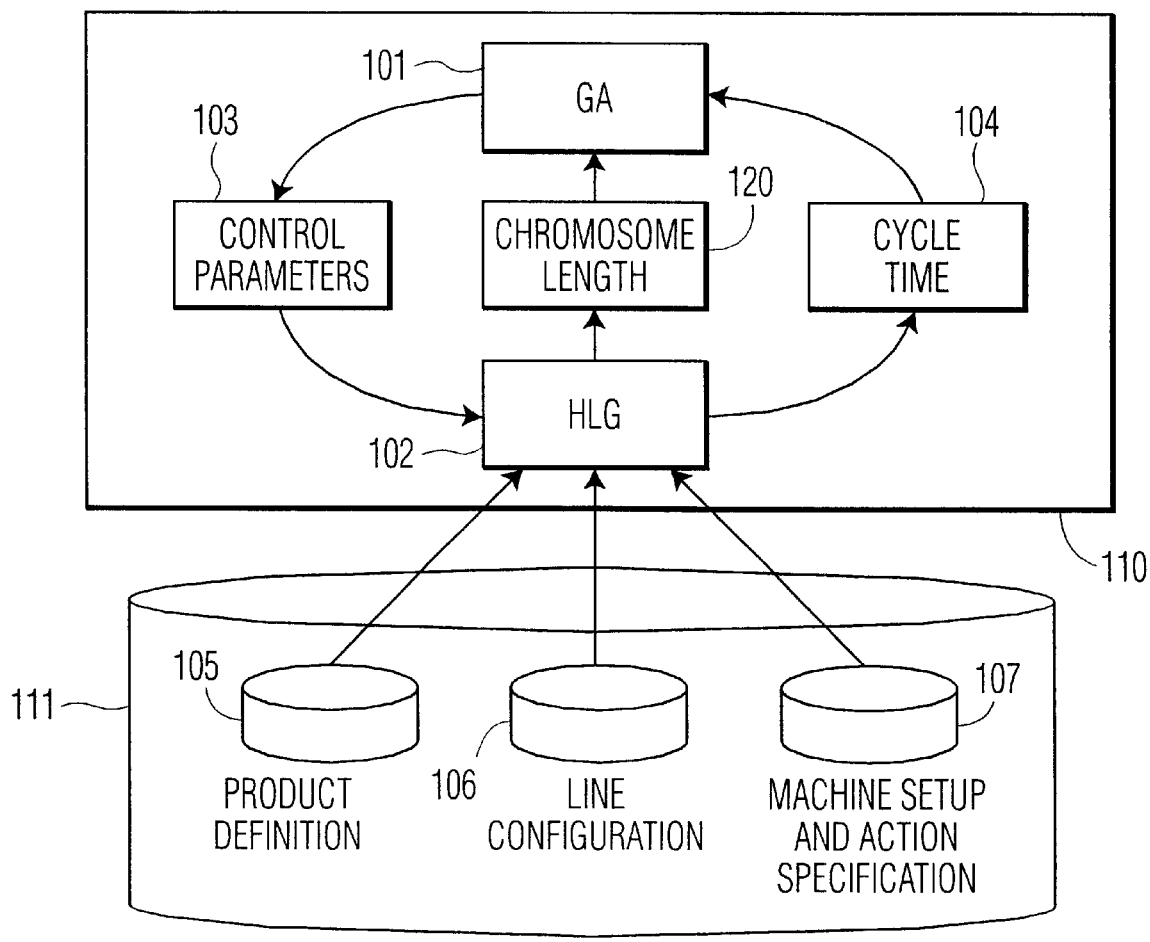
FIG. 2 is a schematic diagram of an example modular optimizer having a foreign optimizer module learning feature in accordance with the invention.

FIG. 2 shows a schematic diagram of the example modular optimizer in which the invention may be implemented. As noted previously, this optimizer may be used to optimize a production line which includes component placement machines 1, 3 of FIG. 1, and may be configured in accordance with the invention to include a foreign optimizer learning feature as will be described in greater detail in conjunction with FIG. 3. The modular optimizer includes a processor 110 which implements a genetic algorithm (GA) 101 and a heuristic layout generator (HLG) 102. Within the processor 110, the GA 101 interacts iteratively with the HLG 102. The processor 110 can be either internal or external to the machines 1, 3.

The GA 101 maintains a population of chromosome strings, which are not shown in the figure. A length 120 of the chromosome strings is supplied to the GA 101 by the HLG 102, during an initialization step. In response to that length, the GA 101 creates the first population of strings. In later iterations, the GA 101 applies mutation and/or crossover, in accordance with the particular type of GA 101. As in the above-cited U.S. Patents, CHC is the preferred type of GA, though other types might equally well be used. The GA 101 then supplies chromosome strings as control parameters 103 to the HLG 102.

The HLG 102 interacts with files defining the product to be manufactured 105, line configuration 106, and machine setup and specification 107, all of which are stored within a memory device 111. The HLG 102 then supplies to the GA 101 measures of fitness 104 associated with the chromosome strings 103. These measures may be cycle times or other types of cost functions. The GA 101 uses these measures of fitness in later iterations.

The cycle illustrated in FIG. 2 repeats until a specified criterion of termination is reached.

Figure 3:
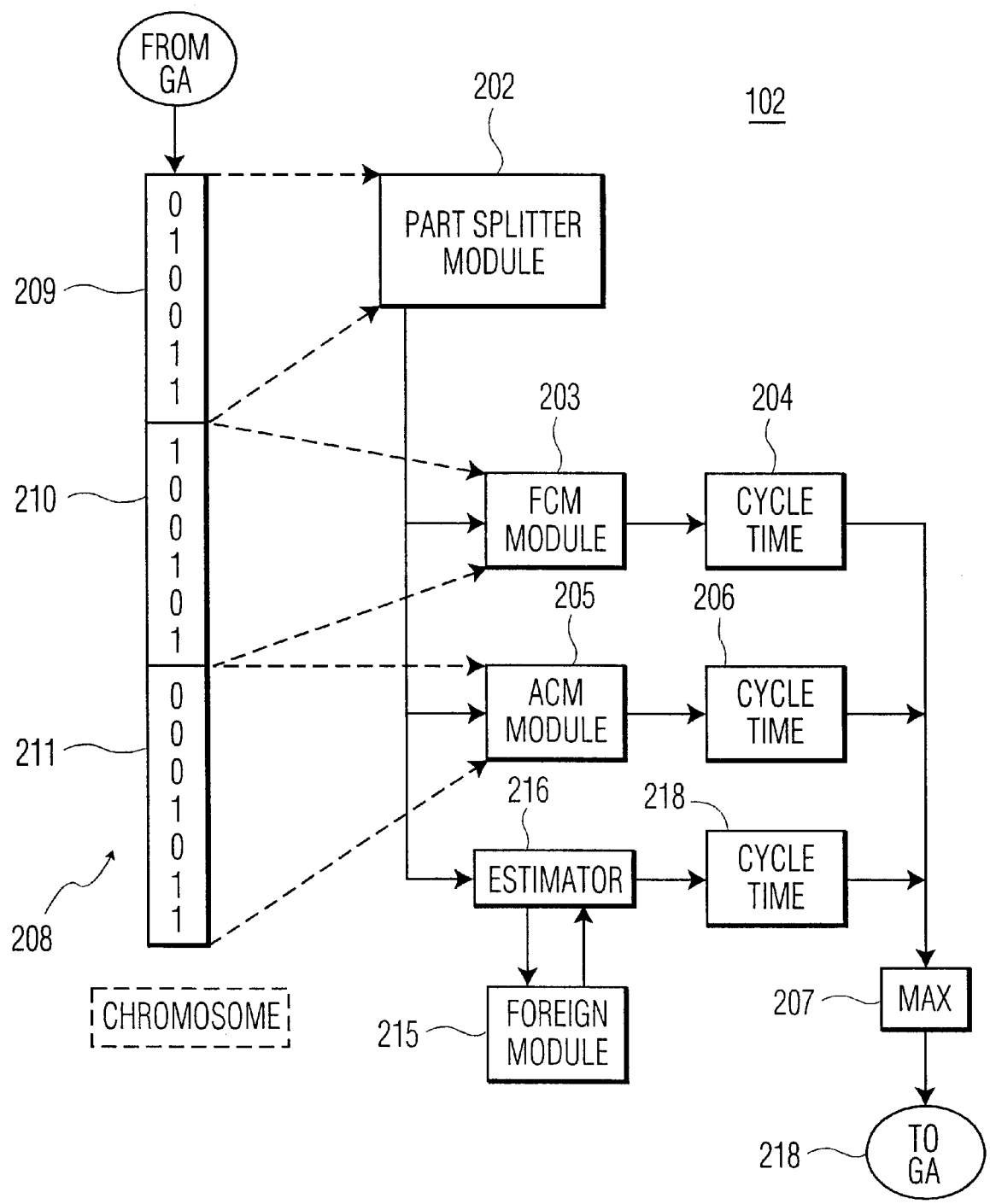
FIG. 3 shows a more detailed schematic diagram of a heuristic layout generator (HLG) portion of the modular optimizer of FIG. 2 showing a foreign optimizer module and corresponding estimator in accordance with an illustrative embodiment of the invention.

FIG. 3 shows a more detailed diagram of the HLG 102 in accordance with the illustrative embodiment of the invention. The HLG 102 as shown in the figure includes a part splitter module 202, an FCM module 203, and an ACM module 205, which operate substantially as described in the above-cited U.S. patent application Ser. No. 09/286,026. It will be assumed for purposes of illustration only that the two machines 1, 3 in the production line of FIG. 1 correspond to an FCM machine and an ACM machine, respectively.

It will further be assumed that the production line is modified to include at least one additional machine. This additional machine is a foreign machine in that it has associated therewith an optimizer module which is unable to generate outputs in accordance with the requirements of the modular optimizer 102 of FIG. 2. For example, the foreign machine may be a machine known in the art as a Philips TOPAZ component placement machine. Such a machine has associated therewith a non-GA-based optimizer with relatively long run time requirements, and is thus generally not suitable for direct implementation in the example GA-based modular optimizer of FIGS. 2 and 3.

In accordance with the present invention, the HLG 102 further includes a foreign optimizer module 215 and a corresponding adapting estimator 216. The foreign optimizer module 215 represents the above-noted optimizer module of the foreign machine added to the production line. The adapting estimator 216 generates estimates of the outputs of the foreign optimizer module 215. The estimator 216 is adaptive in that over time it compares its estimates to actual outputs of the foreign optimizer module 215, and then adapts future estimates based on what it has learned from these comparisons about the operation of the foreign optimizer module.

From GA 101, the HLG 102 receives a chromosome string 208. Only one string is shown in this figure, but the HLG typically acts on each string generated by the GA. A first portion 209 of the chromosome string 208 represents parameters controlling how parts are to be split among the machines of the example production line, i.e., among the FCM machine, the ACM machine and the above-noted additional foreign machine. A second portion 210 of the chromosome string 208 represents parameters controlling layout of the first machine 1, which is assumed for this example to be an FCM machine. A third portion 211 of the chromosome string 208 represents parameters controlling layout of the second machine 3, which is assumed for this example to be an ACM machine. There may be one or more additional portions of the chromosome string 208, including genes used for each of the machines. The chromosome string here is shown schematically as having a fairly small number of bits. In fact, an actual chromosome string will generally be much longer, e.g., 100–4000 bits. Moreover, the order of the chromosome portions 209, 210 and 211 as shown in FIG. 3 is optional. The same function can be achieved with these segments in any order.

Although this example is given in terms of two particular machine types, i.e., FCM and ACM machines, and an additional foreign machine, the modular optimizer may equally well be adapted to lines with other numbers and types of machines by those of ordinary skill in the art.

Within the HLG 102, the splitter module 202 first works under control of the first portion 209 of the chromosome string 208 to produce a parts allocation between machine 1, machine 3 and the additional foreign machine. Then the two modules 203, 205 generate layouts for machines 1, 3, respectively. Modules 203 and 205 operate in the manner described in the above-cited U.S. Pat. Nos. 5,390,283, 5,864,833 and 5,909,674. For example, these modules may operate as separate HLG modules, as described in U.S. Pat. No. 5,390,283, or may be line type modules directed to deal with a particular type of machine, as described in U.S. Pat. No. 5,864,833. It should be noted that each module 203 and 205 can actually optimize a line of several machines, so long as those machines are of the same type.

In accordance with the invention, the estimator 216 generates estimates of the layouts that would be generated by the foreign optimizer module 215, without actually running the full optimization for each iteration of the loop shown in FIG. 2. More particularly, the estimator 216 is designed to estimate a value which would be returned by the foreign optimizer module 215 if it were given a specific subtask to be performed on the foreign machine type. The estimator 216 is preferably responsive to the subtask. As noted previously, the estimator 216 is an adapting estimator and is configured to be self-adjusting. At designated intervals, but typically far less often than the estimator 216 is called, the full foreign optimizer module 215 is called with a specific subtask. These designated intervals may correspond to restarts of the CHC GA 101, as will be described in greater detail below. The full optimization of the optimizer module 215 is thus run only intermittently, in accordance with its own particular run time requirements. The value returned by the foreign optimizer module 215 is compared to the estimate for the same subtask, and the estimator 216 is adjusted so as to reduce its error. Over time, the estimator learns about the operation of the foreign optimizer module, and thus becomes a more accurate predictor of the foreign optimizer module.

After modules 203, 205 and 216 generate layouts, respective modules 204, 206 and 218 of the modular optimizer determine cycle time measures of fitness for those layouts. Modules 204, 206 and 218 may also be configured as described in the above-cited U.S. Pat. Nos. 5,390,283, 5,864,833 and 5,909,674. Then element 207 determines a maximum cycle time for the entire line from the component cycle times produced by modules 204, 206 and 218. Although this example includes only three component placement machines, i.e., an FCM machine, ACM machine and a foreign machine, the modular optimizer can equally well be extended to more machines, and to different types of machines, e.g., multiple different types of foreign machines.

The modularity of the above-described modular optimizer is particularly well adapted to the addition of new non-foreign machine types, since the entire chromosome does not have to be redesigned for each non-foreign machine type added. Only new chromosome portions need to be added for new non-foreign machine types. In accordance with the invention, an adapting estimator and foreign optimizer module may be added to the modular optimizer for each new foreign machine type added to the production line. It should be noted, however, that the amount of uncertainty or noise in the evaluation will generally increase with the number of foreign optimizers active in a given implementation. For example, it is expected that an embodiment with two different active foreign optimizers would produce less certain outputs than an embodiment with only one active foreign optimizer.

In the HLG 102, none of the modules need to be modified with the addition of new non-foreign machine types. Instead, new modules analogous to modules 203–206 can be added at the bottom of the figure for the additional non-foreign machines. As previously noted, each foreign machine type may have a corresponding adapting estimator and a foreign optimizer module in the modular optimizer.

It should be noted that, if one of the machines is modified, only the modules and chromosome portions relating to that machine need to be changed.

Element 207 outputs the maximum cycle time as a measure of fitness to the GA 101, which iterates to the next step of the process.

When iteration between the GA 101 and the HLG 102 appears to be converging on a reasonable solution, modules 203, 205 and the foreign optimizer module 215 can output the final layout to be used on the machines 1, 3 and the additional foreign machine, respectively.

As previously noted, the search algorithm underlying this particular example modular optimizer is CHC, a particular version of a GA developed by Philips Electronic North America Corp. Additional details on the CHC can be found in the above-cited U.S. Pat. Nos. 5,390,283, 5,864,833 and 5,909,674, and in L. J. Eshelman, "The CHC Adaptive Search Algorithm: How to Have Safe Search When Engaging in Nontraditional Genetic Recombination," in Foundations of Genetic Algorithms, G. Rawlins ed., Morgan Kaufmann, San Mateo, Calif. 1991, which is incorporated by reference herein. An important feature of CHC is its restarts, also referred to as divergences. Like all GAs, CHC maintains a population of trial solutions and uses these solutions to generate new trial solutions. The best solutions are selected and replace the worst solutions. Each cycle of generating new solutions and selecting the fittest is called a generation. Over time the population converges to very similar solutions. When this happens, CHC does a restart. The best solution is used as a template for creating a new population of individual solutions that are variants of the best solution found so far. Then the process is continued. Therefore, in the process of searching for good solutions using CHC as the GA 101, there will be repeated restarts.

A trial solution in the above-described modular optimizer is a given set of the parameters 103 which control the HLG 102. As previously described, the HLG generates a layout for a given configuration of component placement machines for a given PCB or other assembly structure. The GA then searches for a set of parameters which will enable the HLG to generate a very good solution.

The adapting estimator 216 is in effect used in place of the HLG for the foreign machine type, and the corresponding foreign optimizer module 215 is called only intermittently, e.g., at each of the above-noted CHC restarts, in order to adjust the estimates. Although shown as part of the HLG 102 in FIG. 3, the adapting estimator 216 and foreign optimizer module 215 need not be viewed as part of the HLG 102. Alternatively, elements 215 and 216 could be viewed as stand-alone elements in the modular optimizer of FIG. 2, could be distributed across the GA 101 and the HLG 102, or could be otherwise arranged to operate in conjunction with the modular optimizer in the manner described.

The estimator 216 in the illustrative embodiment may be configured such that it does not differentiate between parts, i.e., every additional part may get the same cost increment such that each part is treated as being of equal weight. An example of an estimate routine of this type for use with the above-noted TOPAZ machine type is described below. In other embodiments, the estimator may be configured such that it does differentiate between parts, by introducing differences in cost increment or weight between different parts, or by otherwise introducing additional information. It is expected that such additional information would result in more accurate estimates.

III. Calls to Foreign Optimizer Module 215 and Estimator 216

Proper calling of the foreign optimizer module 215 or estimator 216 will generally require a number of modifications to the above-described CHC. More particularly, a restart routine chc_diverge_init of CHC may be modified such that at the beginning of this routine, a verification routine verify_estimate( ) is called. This latter routine checks to see if the modular optimizer includes any active foreign optimizer modules. If so (e.g., if n_topaz>0), the verify_estimate( ) routine calls an evaluation routine (eval) of the GA 101 with a verify_estimate_flag set and the best individual found so far as its chromosome.

When the verify_estimate_flag is set, the eval routine calls the foreign optimizer module, e.g., foreign optimizer module 215, instead of the estimator 216. The value returned by the eval routine is then compared to the old value stored in the best individual's chromosome. If the new value is better, a save_actual_best_chrm routine is called. Otherwise, a restore_actual_best_chrm routine is called. The save_actual_best_chrm routine copies the new (actual) performance value into the best individual's chromosome, copies this individual into an actual_best chromosome data structure (so that it won't be lost during the next restart), and updates an estimation factor. The estimation factor is an example of one type of parameter of the adapting estimator 216 and is used in generating estimated output values.

The restore_actual_best_chrm routine copies the actual_best chromosome into a best_individual data structure so that this old, better individual can be used for seeding the restart.

An example estimate routine for use in estimator 216 for estimating outputs of a foreign optimizer module for the above-noted TOPAZ machine may be configured to multiply the number of parts (n parts) placed on the TOPAZ machine by 500 (corresponding to a 500 millisecond part placement time), to add 9000 (corresponding to a 9 second run-in time), and then to multiply by a TOPAZ estimation factor (est_factor) which may initially be set to a designated value such as zero or one. In accordance with the invention, the initial estimation factor is subsequently adjusted each time the foreign optimizer module is called so that ((500*n_parts)+9000)*est_factor equals the actual time returned by the foreign optimizer module.

The above described modifications may be implemented in otherwise conventional divergence and evaluation programs of the CHC. The routines noted above can be implemented in a straightforward manner by those skilled in the art. Those skilled in the art will also recognize that other software changes may be needed, e.g., to configure an existing modular optimizer to permit handling of additional machine types. Such changes will generally depend on the particular implementation, and can also be made in a straightforward manner.

Although as previously noted the foreign optimizer module 215 in the illustrative embodiment may be called at restarts of the CHC GA 101, numerous alternative arrangements are possible. In general, any call to the foreign optimizer module should occur at a natural place in the search. There are several natural places for calling the foreign optimizer module, including the following:

1. Whenever a new offspring is encountered that is likely to get into the population, i.e., is likely to survive.
2. Whenever a potentially new best individual is encountered.
3. Whenever there is a restart, and a new best has been found since the last restart.

Given that a typical accept rate (percent of new individuals which survive) is about 10–20%, the first alternative is likely to be very expensive. And the cost is likely to be higher than this number indicates, since the determination of whether an individual is likely to be accepted is based on its estimated value. Some of these new individuals, once fully evaluated, will turn out to be unacceptable. This could easily double the number of full evaluations.

The number of new best individuals is considerably lower, ranging from about 10–20 to about 100–200 depending on the particular application. However, given that some of the new best individuals many not really be new best when fully evaluated, these numbers are likely to at least double. If the full evaluation takes less than a minute, this approach may be practical. If the full evaluation takes more than a few minutes, then the only practical approach may be the third approach given above. The number of restarts is usually less than ten, although the number of restarts may have to be increased because of the noise. If the number of restarts doubles, and each call of the foreign optimizer requires, e.g., a half an hour, then this would add ten hours to the optimizer run time. Furthermore, most of the new best occur during the first convergence, i.e., before the first restart. So calling the foreign optimizer module for every new best will seriously slow the search at the beginning, and thus prolong the time it takes to find an acceptable solution. If the goal is to allow the user to discontinue the search whenever an acceptable solution has been found, then a better solution than allowing more calls to the foreign optimizer module would be to allow the user to initiate a call to the foreign optimizer module whenever a solution is found that appears acceptable. This call would adjust the estimate. If the adjusted value is acceptable to the user, then the search could be discontinued.

Simulations indicate that the first approach given above provides increased accuracy, but is very costly, while the second approach does not significantly improve accuracy and therefore may not be worth its additional cost.

However, a possible hybrid approach is to use the second approach only after the first restart. This would significantly cut down on the number of calls to the foreign optimizer module.

Of course, there are many other possible alternatives. For example, the foreign optimizer module might be called more often in the beginning of an optimization process in order to tune the estimator. However, this might not be that helpful if the foreign optimizer module were called for bad solutions, even if these solutions are the best ones found so far, since these early best, but ultimately bad, solutions might be misleading. Another alternative would be to use a smaller population before the first restart to speed up the convergence and thus get a call to the foreign optimizer module sooner.

Whenever the foreign optimizer module is called, if the actual cycle time is better than the estimated cycle time, a new estimation factor is calculated. At the time of a restart this does not present a problem, since only the best member of the population, the one for which the actual cycle time has just been calculated, is kept. However, at any other point, there will be a number of other members of the population whose fitness values (cycle times) are based on the old estimation factor. These values need to be re-calculated so valid comparisons can be made. Since the final fitness value is the maximum of the cycle times for each machine, and one of these values may have changed, it may be necessary either to save these values or to re-calculate them so that the new maximum value can be obtained.

IV. Calibrating an Initial Estimate

As noted above, the adapting estimator 216 uses one or more estimation factors to generate its estimated output values. These factors are also referred to herein as weights.

If an initial set of weights used by the adapting estimator 216 is not very accurate, then the results at the first restart will not be very accurate. One possible solution is to make a few calls to the foreign optimizer module 215 using a select set of parts in order to determine a better set of initial weights for the estimator. For example, the foreign optimizer module 215 could be called with no parts, 1 part, 4 parts, 8 parts, 16 parts, and 20 parts. Then based on results for each of these numbers, better initial estimator weights could be chosen.

The number of parts could be chosen based on natural boundaries such as, e.g., the number of pipette modules (PMs) on the TOPAZ machine. This machine typically includes 8 PMs. The larger number of parts (20 in the above example) could be chosen based on an estimate of how many parts will need to be placed using the foreign optimizer module in order to get a balanced load. This estimate could be obtained by using pp_time_lower information for the FCM and ACM machine types, as described in the above-cited U.S. Pat. No. 5,390,283.

Alternatively, the foreign optimizer module could be called once for each part. The values returned could be used in place of the above-noted pp_time_lower information. This allows the foreign optimizer module to differentiate among parts and thus make more accurate estimates. This same information, along with one or more calls to the foreign optimizer module for sets of parts, could then be used for calibrating the initial estimate.

V. Splitting of Parts Over Machine Types

The part splitter module 202 of FIG. 3 is responsible for splitting parts among the different machine types of a given production line. This module primarily assigns different part types to different machine types (part splitting), but may need to split the parts of one part type across different machine types (part type splitting), particularly if there is a large number of parts of one part type.

Most of the splitting over machine types is therefore part splitting done at the part type level. However, one part type is typically selected for which the above-noted part type splitting takes place at the part level. It is generally assumed that the parts for this split part type are sorted based on relative advantage for each machine type. For the above-noted FCM and ACM machines this may be done by comparing the ratios of the FCM and ACM pp_time_lower values. Since there is no corresponding information available for the above-noted TOPAZ foreign machine type, y-distance values as described in the above-cited U.S. Pat. No. 5,390,283 may be used instead. However, this approach involves computing ratios based on different qualities, i.e., y-distance and estimated time, which may be problematic. In many practical applications it does not make much difference how the parts are ordered since part type splitting does not play a large role.

Another issue is whether more than one part type should be split when there are more than two machines. As noted above, one criterion for choosing a part type for splitting is the number of parts. However, part type splitting is only of value if there are few part types and one of them has a lot more parts than the others. So the above-noted criterion for choosing a part type for splitting is generally acceptable.

A possible alternative technique for ordering parts for the split part type is as follows. Instead of sorting the parts on the relative pp_time_lower ratios, the parts may be sorted on the above-noted y-distance values. Although this may not be a completely satisfactory solution, it is general for more than two machine types, and it at least allows the chromosome to have some control. It may not lead to improved performance in all cases.

The invention can be implemented at least in part in the form of one or more software programs stored in an electronic, magnetic or optical memory or other type of machine-readable medium. For example, the various modules of the modular optimizer as described above can be implemented in the form of software stored in the memory 111 and executed by the processor 110.

The above-described embodiments of the invention are intended to be illustrative only. For example, the invention can be used in other types of modular optimizers, and can be applied to production lines with a wide variety of different arrangements and types of component placement machines. These and numerous other embodiments within the scope of the following claims will be apparent to those skilled in the art.

What is claimed is:

1. A method for use in determining a configuration of a production line comprising one or more component placement machines used to place components for assembly, the configuration being determined using a modular optimizer having associated therewith at least one machine optimizer module for a given component placement machine type, the method comprising the steps of:

estimating an output value for at least one foreign optimizer module associated with a component placement machine type foreign to the modular optimizer; and utilizing the estimated output value in the modular optimizer to determine the configuration of the production line.

2. The method of claim 1 wherein the at least one machine optimizer module comprises an FCM module for an FCM machine type.

3. The method of claim 1 wherein the at least one machine optimizer module comprises an ACM module for an ACM machine type.

4. The method of claim 1 further including the step of periodically calling the foreign optimizer module, and for a given one of the calls comparing a resulting output value generated by the foreign optimizer module to the estimated output value.

5. The method of claim 4 wherein the foreign optimizer module is called once for each of a plurality of designated intervals.

6. The method of claim 4 wherein the foreign optimizer module is called based at least in part on a restart of a genetic algorithm of the modular optimizer.

7. The method of claim 6 wherein the foreign optimizer module is called whenever there is a restart of the genetic algorithm of the modular optimizer and a new best individual has been found since a previous restart.

8. The method of claim 4 wherein the foreign optimizer module is called each time a new offspring of a genetic algorithm of the modular optimizer is encountered that is likely to get into a surviving population.

9. The method of claim 4 wherein the foreign optimizer module is called whenever a potentially new best individual is encountered in a genetic algorithm of the modular optimizer.

10. The method of claim 4 wherein when the foreign optimizer modular is called, if its actual output value for a corresponding estimated value is determined to provide an improved result, at least one parameter of an estimator used to generate the estimated output value is altered so as to reduce an error associated with generation of subsequent estimated output values.

11. The method of claim 1 wherein the estimated output value comprises an estimated cycle time associated with placement of one or more designated components by a component placement machine of the foreign machine type.

12. The method of claim 1 further including the step of calibrating an estimator which generates the estimated output value using one or more calls to the foreign optimizer module.

13. The method of claim 12 wherein the foreign optimizer module is called one or more times using a designated set of components.

14. The method of claim 12 wherein the foreign optimizer module is called at least one time for each component in a designated set of components.

15. An apparatus for determining a configuration of a production line comprising one or more component placement machines used to place components for assembly, the configuration being determined using a modular optimizer having associated therewith at least one machine optimizer module for a given component placement machine type, the apparatus comprising:
  a memory for storing information characterizing at least a portion of the production line; and
  a processor coupled to the memory and operative to estimate an output value for at least one foreign optimizer module associated with a component placement machine type foreign to the modular optimizer, and to utilize the estimated output value in the modular optimizer to determine the configuration of the production line.

16. The apparatus of claim 15 wherein the processor is further operative to call periodically the foreign optimizer module, and for a given one of the calls to compare a resulting output value generated by the foreign optimizer module to the estimated output value, and if necessary to alter at least one parameter of an estimator used to generate the estimated output value so as to reduce an error associated with generation of subsequent estimated output values.

17. A modular optimizer for determining a configuration of a production line comprising one or more component placement machines used to place components for assembly, the modular optimizer comprising:
  at least one machine optimizer module for a given component placement machine type; and
  an estimator operative to estimate an output value for at least one foreign optimizer module associated with a component placement machine type foreign to the modular optimizer;
    wherein the modular optimizer utilizes the estimated output value in determining the configuration of the production line.

18. The modular optimizer of claim 17 being operative to call periodically the foreign optimizer module, and for a given one of the calls to compare a resulting output value generated by the foreign optimizer module to the estimated output value, and if necessary to alter at least one parameter of the estimator used to generate the estimated output value so as to reduce an error associated with generation of subsequent estimated output values.

19. An article of manufacture comprising a machine-readable medium for storing one or more software programs for use in determining a configuration of a production line comprising one or more component placement machines used to place components for assembly, the configuration being determined using a modular optimizer having associated therewith at least one machine optimizer module for a given component placement machine type, the one or more programs when executed implementing the steps of:
  estimating an output value for at least one foreign optimizer module associated with a component placement machine type foreign to the modular optimizer; and
  utilizing the estimated output value in the modular optimizer to determine the configuration of the production line.

20. The article of manufacture of claim 19 wherein the one or more programs when executed are further operative to call periodically the foreign optimizer module, and for a given one of the calls to compare a resulting output value generated by the foreign optimizer module to the estimated output value, and if necessary to alter at least one parameter of an estimator used to generate the estimated output value so as to reduce an error associated with generation of subsequent estimated output values.

* * * * *